United States Patent [19]

Yu

[11] Patent Number: 5,691,077
[45] Date of Patent: Nov. 25, 1997

[54] SHUTDOWN, TRILAYER BATTERY SEPARATOR

[75] Inventor: Wei-Ching Yu, Charlotte, N.C.

[73] Assignee: Hoechst Celanese Corporation, Warren, N.J.

[21] Appl. No.: 650,210

[22] Filed: May 20, 1996

Related U.S. Application Data

[63] Continuation of Ser. No. 359,772, Dec. 20, 1994, abandoned.

[51] Int. Cl.$^6$ .................................................. H01M 10/50
[52] U.S. Cl. ........................ 429/62; 429/144; 29/623.3; 29/623.4; 428/516
[58] Field of Search ............................... 29/623.3, 623.4; 428/516; 429/254, 145, 144, 141, 62

[56] References Cited

U.S. PATENT DOCUMENTS

| | | | |
|---|---|---|---|
| 4,625,395 | 12/1986 | Rowlette | 29/623.4 |
| 4,650,730 | 3/1987 | Lundquist et al. | 429/62 |
| 5,240,655 | 8/1993 | Troffkin et al. | 264/28 |
| 5,281,491 | 1/1994 | Rein et al. | 429/62 |
| 5,385,777 | 1/1995 | Higuchi et al. | 428/316.6 |
| 5,409,588 | 4/1995 | Mushiake et al. | 204/252 |
| 5,453,333 | 9/1995 | Takauchi et al. | 429/62 |
| 5,462,777 | 10/1995 | Hayashida et al. | 428/516 X |
| 5,534,365 | 7/1996 | Gee et al. | 429/62 |

FOREIGN PATENT DOCUMENTS

| | | |
|---|---|---|
| 0228757 | 7/1987 | European Pat. Off. |
| 55/105968 | 8/1980 | Japan |
| 55/146873 | 11/1980 | Japan |
| 56/147361 | 11/1981 | Japan |
| 61/265043 | 11/1986 | Japan |
| 01/319250 | 12/1989 | Japan |

Primary Examiner—Stephen Kalafut
Attorney, Agent, or Firm—Robert H. Hammer, III

[57] ABSTRACT

The present invention is directed to a shutdown, trilayer battery separator. The separator has a first and a third microporous membranes sandwiching a second microporous membrane. The first and the third membranes have a greater puncture strength than the second membrane. The second membrane has a lower melting temperature than either the first or the third membranes.

20 Claims, 2 Drawing Sheets

SHUTDOWN, TRILAYER BATTERY SEPARATOR

This is a continuation of application Ser. No. 08/359,772 filed on Dec. 20, 1994, now abandoned.

FIELD OF THE INVENTION

The present invention is directed to a shutdown battery separator.

BACKGROUND OF THE INVENTION

Shutdown battery separators are known. For example, see U.S. Pat. Nos. 4,650,730; 4,731,304; 5,240,655; 5,281,491; and Japanese Kokai No. 6-20671, each of the foregoing is incorporated herein by reference.

In batteries, the anode and cathode are separated from one another by a separator. Today, "lithium batteries" are very popular because they are able to generate high energy outputs. The lithium battery market can be divided into two groups, the "primary" lithium battery and the "secondary" lithium battery. The primary lithium battery is a disposable battery, while the secondary lithium battery is a rechargeable battery. A problem associated with secondary lithium batteries is its potential for short circuiting. This short circuit may manifest itself with a rapid evolution of heat. This rapid evolution of heat can cause the battery to explode. Accordingly, the shutdown battery separator was developed.

The shutdown battery separator generally comprises two polymerically dissimilar and juxtaposed microporous membranes. One microporous membrane is chosen for its relatively low melting point and the other for its relative strength. For example, the low melting point membrane may be a polyethylene material and the strength membrane may be a polypropylene material. The polyethylene microporous membrane has a melting point of approximately 130°–135° C. which is sufficiently low that in the event of a short circuit in a lithium battery, the heat generated will melt the polyethylene and shutdown, or fill in the pores of the separator, and thereby stop or inhibit the likelihood of a short circuit. The polypropylene membrane which has a substantially higher melting point, approximately 160° C., provides strength to the separator so that it maintains the separator's integrity in the event of a short circuit.

In U.S. Pat. Nos. 4,650,730; 4,731,304; 5,240,655; and 5,281,491, and Japanese Kokai 6-20671, shutdown battery separators of the foregoing type are disclosed. In the examples of U.S. Pat. Nos. 4,650,730 and 4,731,304, bilayer separator thicknesses of 3–4 mils are disclosed. In Japanese Kokai 6-20671, a shutdown, bilayer battery separator has a thickness of about 1 to 2 mils.

In U.S. Pat. Nos. 5,240,655 and 5,281,491, multi-ply separators are disclosed. In Examples 2 and 3 of U.S. Pat. No. 5,240,655, a polyethylene—ethylene butene copolymer—polyethylene trilayer separator is disclosed. In Example 4 of U.S. Pat. No. 5,281,491, a polyethylene—ethylene butene copolymer—polyethylene trilayer separator is disclosed. Each of the foregoing separators is made by a coextrustion, extraction, stretching process.

When designing new shutdown battery separators of the foregoing type, several factors, in addition to the shutdown characteristics, are important. They include: thinness, puncture strength, and peel strength. In the manufacture of batteries, it is important to have extremely thin separators, so that the electrical resistance across the separator, as well as, the size of the battery, may be reduced. Good puncture strength is important in battery manufacture, particularly in the manufacture of "jelly roll" type batteries because the surfaces of the anode and the cathode can be sufficiently rough that they can puncture these extremely thin separators during manufacture. Good peel strength is important in battery manufacture because it prevents delamination of the separator. Accordingly, there is a need to produce an extremely thin, shutdown battery separator that has a sufficient puncture strength and peel strength to withstand the rigors of battery manufacture.

In the manufacture of secondary lithium batteries good puncture strength is of particular importance. The anode and cathode used in secondary lithium batteries typically have rough surfaces. These rough surfaces present a special manufacturing consideration because they can damage the thin separators during the battery assembly. Bilayer battery separators, that have a shutdown layer and a strength layer, are suspectable to damage of the shutdown layer (it is weaker than the strength layer) during manufacture, by the rough electrode surface. Accordingly, there is a need for a battery separator that can withstand, among other things, the rough sided electrodes encountered in the manufacture batteries, for example, secondary lithium batteries.

SUMMARY OF THE INVENTION

The present invention is directed to a shutdown, trilayer battery separator. The separator has a first and a third microporous membranes sandwiching a second microporous membrane. The first and the third membranes have a greater puncture strength than the second membrane. The second membrane has a lower melting temperature than either the first or the third membranes. The first and the third membranes are preferably made from polypropylene. The second membrane is preferably made from polyethylene.

DESCRIPTION OF THE DRAWINGS

For the purpose of explaining the invention, there is shown in the drawings various preferred aspects of the invention; it being understood, however, that this invention is not limited to the precise arrangements and instrumentalities shown.

DESCRIPTION OF THE INVENTION

The present invention shall be described in further detail below by way of the following detailed description and the non-limiting examples.

Figure 1:
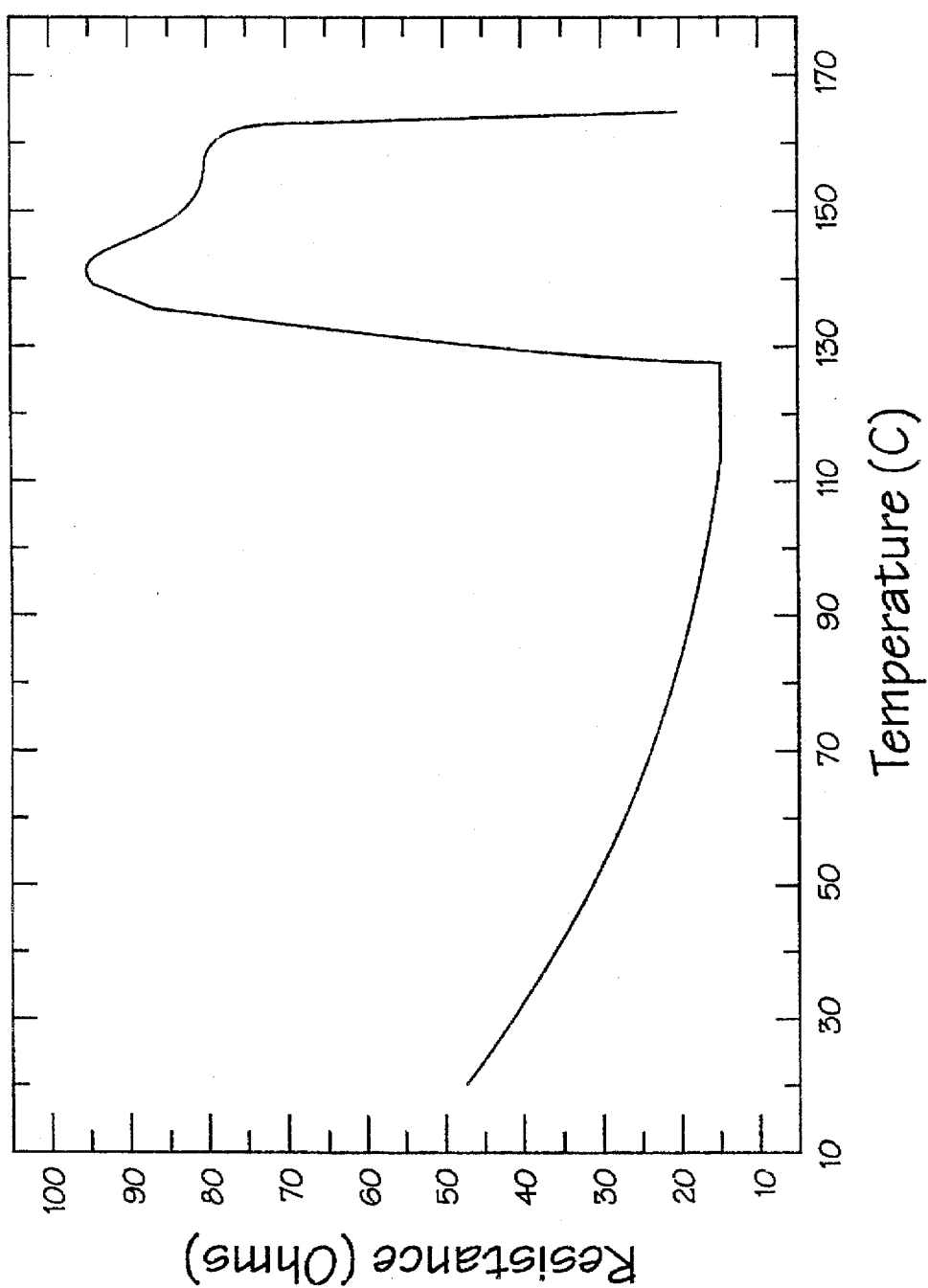
FIG. 1 is a graphical representation of a trilayer battery separator's ability to shutdown a battery (as measured by electrical resistance, in ohms) as a function of temperature (in °C.).

Shutdown battery separator, as used herein, refers to a battery separator that has the ability to shutdown ion migration across the separator in response to a particular event, for example, the rapid evolution of heat. In FIG. 1, a graph illustrates the function of a shutdown battery separator. Shutdown ability is represented by resistance (in ohms), and the evolution of heat is represented by temperature (in °C.). As the temperature increases over an initial range, resistance is little changed. Resistance values spike-up, however, as the temperature reaches the melt temperature of the shutdown layer. After the resistance spike-up, the resistance values plateau until the temperature reaches the melt temperature of the strength layers. The data used for plotting the graph of FIG. 1 was obtained from tests on a trilayer shutdown battery separator, made according to the instant invention. This trilayer separator was constructed from polypropylene (PP)—polyethylene (PE)—polypropylene (PP). Further information about shutdown battery separators maybe obtained from U.S. Pat. Nos. 4,640,730; 4,731,304; 5,2240,655; 5,281,491; Japanese Kokai No. 6-20671; U.S. patent application No. 08/341,239 filed Nov. 17, 1994, entitled "Methods of Making Cross-Ply Microporous Membrane Battery Separators, and the Battery Separators Made Thereby"; and U.S. patent application No. 08/348,630 filed Dec. 2, 1994, entitled "Shutdown, Bilayer Battery Separator", each of which is incorporated herein by reference.

The shutdown battery separators according to the instant invention has at least three layers. Each of these layers is, of course, microporous, and preferably, it is a discrete microporous membrane. (For example see Kesting, R.E., *Synthetic Polymeric Membranes,* 2nd Ed., John Wiley & Sons, New York City, N.Y., (1985) at section 8.2 versus *Ibid.,* Chapter 7, this reference is incorporated herein by reference.) The outermost layers provide the strength, particularly strength to resist puncture, for example by rough electrode surfaces. This strength quality maybe quantified as puncture strength (defined hereinbelow). A layer between those outermost layers provides the shutdown quality. Preferably, the puncture strength of the outermost layers is relatively greater than that of the inner shutdown layer, and the melting temperature of the inner shutdown layer is relatively less than that of the outermost strength layers. In the preferred embodiment of the trilayer, shutdown battery separator, the outermost strength layers sandwich the inner shutdown layer.

The strength quality of the outermost layers referred to above is the principal, but not necessarily the sole, function of the layer which is the ability to facilitate the manufacture of the battery by providing greater puncture strength to the separator, as well as, to maintain the integrity of the separator in the event of a short circuit. Preferably, in lithium batteries, the strength capabilities can be provided by a material that will melt at a temperature at about or greater than the melting temperature of the lowest melting electrode (e.g., the lithium material). An example of such a material is a polyolefin, for example: polypropylene or a blend comprising substantially polypropylene or copolymer of polypropylene.

The shutdown quality of the inner layer referred to above is the principal, but not necessarily the sole, function of the layer which is the ability to close the micropores of the separators in the event of a short circuit. This typically means that the shutdown layer will melt, at some temperature, blind the pores of the separator, and thereby terminate the short circuit by prohibiting ion migration across the separator. Preferably, in lithium batteries, the shutdown capabilities can be provided by a material that will melt at a temperature at least 20° C. below the melting temperature of the lowest melting electrode (e.g., the lithium material, the melting point of lithium is about 180° C.). An example of such a material is polyethylene or a blend comprising substantially polyethylene or a copolymer comprising substantially polyethylene with melting temperature greater than 110° C.

The thickness of these separators is less than 3 mils (about 75 microns). These separators preferably range in thickness between 0.5 mil (about 12 microns) and 1.5 mils (about 38 microns). Most preferably, the separator has a thickness of about 1 mil (about 25 microns). The total thickness of the separator is predominantly the sum of the individual layers. These individual layers, preferably, have about equal thickness. Measurement details are set forth below.

The puncture strength should preferably be greater than 450 grams. Most preferably the puncture strength should be greater than 480 grams. These measurements are made at an average porosity of 35%. Measurement details are set forth below.

The peel strength should preferably be greater than or equal to 4 grams/inch (1 gram/centimeter). Most preferably, the peel strength should be greater than or equal to 6 grams/inch (1.5 gram/centimeter). Measurement details are set forth below.

The process, by which the inventive separators are made, broadly comprises making a first and third microporous membranes, making a second microporous membrane, and bonding together the first, second, and third membranes. Regarding the preferred method for making the membranes, the process requires the following steps: extruding a polymer to form a sheet; annealing the sheet; and stretching the annealed sheet. The specific methods for making these sheets, particularly polyethylene or polypropylene, will be discussed with references to the method of making membranes having a thickness greater than 1 mil. By way of non-limiting example, the following references, each of which is incorporated herein by reference, illustrate the state of the art for making membranes having a thickness greater than 1 mil: U.S. Pat. Nos: 3,426,754; 3,558,764; 3,679,538; 3,801,404; 3,801,692; 3,843,761; 3,853,601; 4,138,459; 4,539,256; 4,726,989; and 4,994,335, each of the foregoing is incorporated herein by reference. Knowledge of these methods being assumed, the inventive process for making thin membranes shall be described below by way of explaining the differences between the prior art methods for making standard films (thickness greater than 1 mil) and inventive method for making a thin film (thickness less than about ½ mil).

The differences discussed below regarding extrusion, annealing, and stretching are based upon a die configuration of a 27" die equipped with a 70 mil mandrel gap. If the die configuration changes, then the differences will change. For example, if a 6" die is used, the die temperature difference between standard film process and thin film process is much smaller. Regardless of die configuration, thin films require less quench air.

With regard to extrusion conditions, standard film processes typically require stronger quench air conditions and lower extrusion temperatures than thin film processes. For example, the relevant quench conditions for a standard film process include: an air pressure of about 6" $H_2O$; an air ring gap in the range of $10/64$ to $15/64$ inches; and an air ring height of 1 to 2 inches; on the other hand, the relevant quench conditions for a thin film process include: an air pressure of about 0.6 to 3.0" $H_2O$; an air ring gap in the range of $5/64$ to $10/64$ inches; and a ring height of about 1 to 2 inches. The relevant extrusion conditions for a standard film process (using Exxon's Escorene PP 4292 resin as an example) include: a die temperature in the range of 191° to 198° C. and a barrel temperature of 200° to 205° C.; on the other hand, the relevant extrusion conditions for a thin film process (using the same material) include: a die temperature in the range of 210° C. (for 0.5 mil final product) to 224° C. (for 0.33 mil final product) and a barrel temperature of 210° C.

With regard to annealing and stretching conditions, the inter-ply adhesion (measured as peel strength) must be lower than that of the standard process, so that the individual plies do not split (i.e. tear apart) when they are deplied. The ability to resist splitting is proportional to the ply's thickness. Thus, if the plies stick together (due to adhesion) and the stickiness is greater than the split resistance, then the piles cannot be separated (deplied) without splitting. For example, the adhesion of plies having a thickness of about 1 mil should be less than about 15 grams/inch, whereas for 0.5 mil plies, the adhesion should be less than about 8 grams/inch, and for 0.33 mil plies, less than about 5 grams/inch. To lower the adhesion values, the annealing/stretching temperatures for the inventive process are less than those for the standard process. For example, the annealing/stretching temperatures for a polypropylene film would be in the range of 120°–125° C. (inventive process) compared to the range of 140°–150° C. (standard process), and for a polyethylene film about 110° C. (inventive process) compared to about 115° C. (standard process).

Figure 2:
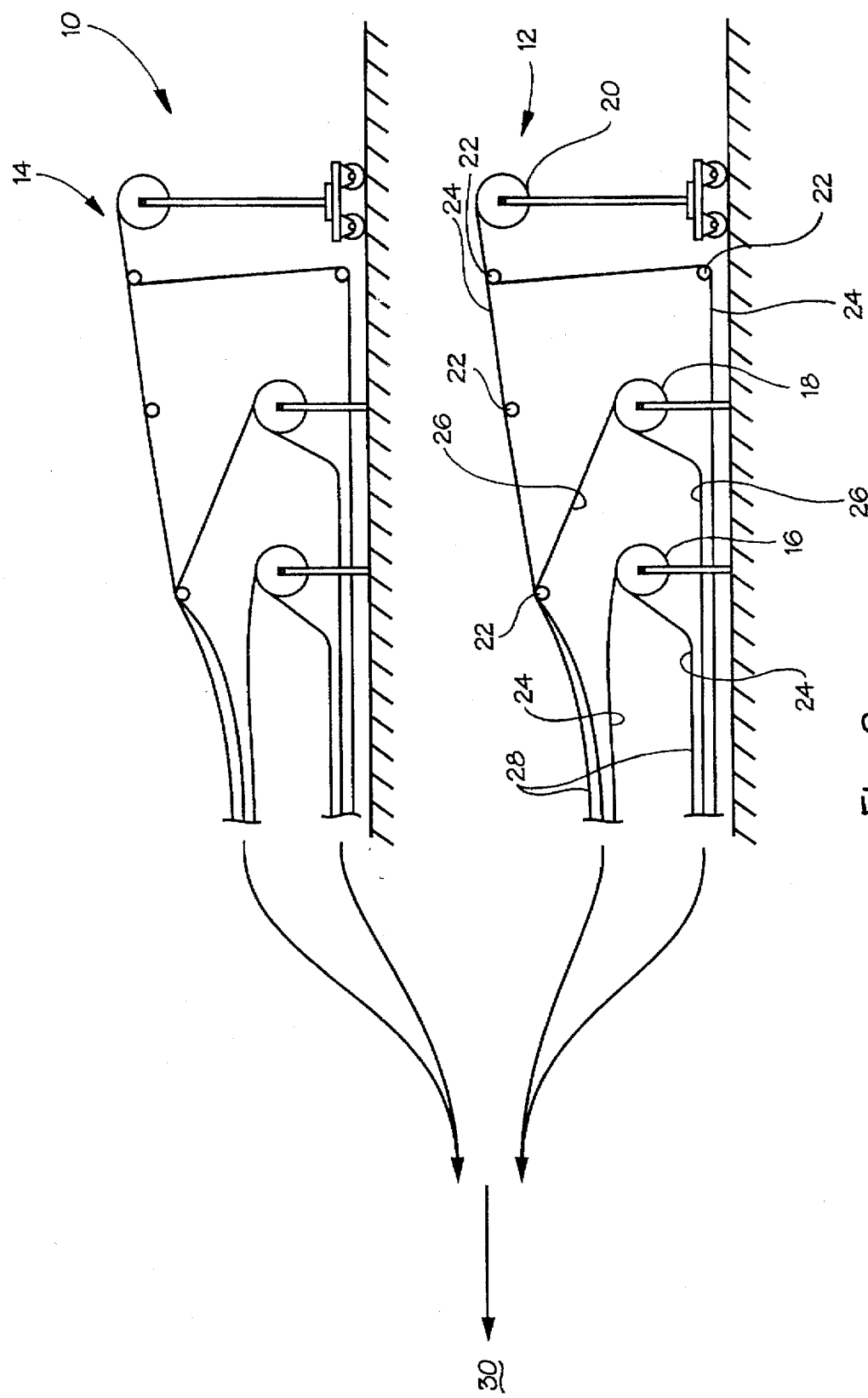
FIG. 2 is a schematic illustration of a deplying and trilayer formation set-up.

To avoid wrinkle formation, trimmed 2-ply films are handled until the trilayer separators are formed. The films' deplying configuration is shown in FIG. 2. In FIG. 2, a deply and trilayer formation scheme 10 is shown. Scheme 10 includes a ground level layout 12 and an elevated layout 14. Layouts 12 and 14 are identical, but for elevation (to efficiently use space), so only layout 12 will be discussed in detail. Layout 12 comprises three unwind stations 16, 18, and 20. Stations 16 and 20 support rolls of polypropylene microporous membrane (i.e., one roll—2 plies), and station 18 supports a roll of polyethylene microporous membrane (i.e., one roll—2 plies). The membranes (i.e., either the PP or PE membranes) in single-ply form are as thin as about ⅓ mil. Membranes or films of this thickness are prone to wrinkling or creasing. To avoid wrinkling or creasing, these membranes are handled (as much as possible), in 2-ply form (about ⅔ mils thick). The polypropylene films 24 and polyethylene films 26 are unwound from their rollers, deplyed, in some cases with the assistance of guide rollers 22, and then replied to form trilayer precursors 28. From scheme 10, four (4) trilayer precursors 28 are formed. At least four trilayer precursors are preferred so to avoid the wrinkle problem and to more efficiently use equipment (economic reasons). A minimum of at least two trilayer precursors is preferred for process economics. The precursors 28 are forwarded to a bonding station 30 (not shown).

Regarding the preferred methods for bonding the membranes together, several bonding methods are contemplated. Broadly, the bonding methods include calendaring, adhering with adhesives, and welding. The application of adhesives may include: air atomizing; gravure/screen printing; hydraulic spraying; and ultrasonic spraying. The choice of adhesive and the rate of adhesive application must be chosen so that the separator's porosity is not adversely effected. The welding technique includes thermal welding and ultrasonic welding. The amount of energy for either welding procedure and the pattern of welds should be chosen so that, among other things, the separator's porosity is not adversely effected. Preferably, bonding is accomplished by calendaring, with nips closed, at a temperature ranging from 125° to 130° C., and a residence time at temperature of about 2 to 10 minutes.

After bonding, the trilayer, shutdown battery separator is rewound for use in the manufacture of batteries, particularly secondary lithium batteries, as is well known in the art.

Further information about the foregoing invention may be obtained from the following non-limiting examples. The test methods referred to herein are set forth below.

| Test Methods | |
| --- | --- |
| Gurley | ASTM-D726 (B) Gurley is a resistance to air flow measured by the Gurley densometer (e.g. Model 4120). Gurley is the time in seconds required to pass 10 cc of air through one square inch of product under a pressure of 12.2 inches of water. |
| Thickness | Method: T411om-83 developed under the auspices of the Technical Association of the Pulp and Paper Industry. Thickness is determined using a precision micrometer with a ½ inch diameter, circular shoe contacting the sample at seven (7) PSI. Ten (10) individual micrometer readings taken across the width of the sample are averaged. |
| Porosity | ASTM D-2873 |
| Density | ASTM D-792 |
| Puncture Strength | Ten measurements are made across the width of the stretched product and averaged. A Mitech Stevens LFRA Texture Analyzer is used. The needle is 1.65 mm in diameter with 0.5 mm radius. The rate of descent is 2 mm/sec and the amount of deflection is 6 mm. The film is hied tight in the camping device with a central hole of 11.3 mm. The displacement (in mm) of the film that was pierced by the needle was recorded against the resistance force (in gram force) developed by the tested film. The maximum resistance force is the puncture strength. |
| Peel strength | Peel strength is measured using a tension and compression tester to determine the force in grams required to separate two one-inch wide sections of bonded membrane. The peel rate is 6 inches/minute. Three measurements are taken across the web and averaged. |
| Melt Index | ASTM D 1238; PE: 190° C./2.16 Kg; PP: 230° C./2.16 Kg. |

EXAMPLE

Shutdown trilayer battery separators, as disclosed above, were made in the following manner:

The polypropylene and polyethylene resins used are set forth in TABLES 1 & 2:

TABLE 1

| Polypropylene (PP Monopolymer) | | | | |
| --- | --- | --- | --- | --- |
| | Resin | Density (g/cm³) | Melt Index (g/10 min) | Supplier |
| A | Escorene PP4292 | 0.90 | 1.4 | Exxon Chemical |
| B | Fina PP 3271 | 0.905 | 1.5 | Fina Oil & Chemical |
| C | Fina PP 3281 | 0.905 | 1.1 | Fina Oil & Chemical |
| D | Escorene PP4292 (nucleated) | 0.90 | 1.4 | Exxon Chemical |
| E | Escorene PP4372* | 0.90 | 1.4 | Exxon Chemical |
| F | Escorene PP3182 | 0.90 | 3.0 | Exxon Chemical |

*contains an antiblocking agent

TABLE 2

Polyethylene (HDPE)

| Resin | | Density (g/cm³) | Melt Index (g/10 min) | Supplier |
|---|---|---|---|---|
| G | Fina HDPEGF7750 | 0.958 | 0.70 | Fina Oil & Chemical |
| H | Escorene HDZ107 | 0.964 | 0.30 | Exxon Chemical |

The extruder equipment was configured, as set forth in TABLE 3:

TABLE 3

Extruder

| | L/D Ratio | Barrel Size | Die Size | Die Opening | Land Length | Blow-up Ratio |
|---|---|---|---|---|---|---|
| E1 | 24 | 2.5" | 12" or 27" | 70 mil | 3" | 1 |
| E2 | 24 | 3.5" | 12" or 27" | 70 mil | 3" | 1 |
| E3 | 30 | 1.25" | 6" | 70 mil | 3" | 1 |

The resins were extruded as set forth in TABLE 4 to form a tubular precursor films (parison), as set forth in TABLE 4:

TABLE 4

Extrusion Condition

| Product | Resin (See Tables 1 & 2) | Extruder/ Die Size (see Table 3) | Extruder Temp (°C.) | Melt Temp (°C.) | Die Temp (°C.) | Air Ring Height (inch) | Quenching Air Press (inches H₂O) | Air Ring Opening (inches) | Thickness (mil) | Line Speed (ft/min) |
|---|---|---|---|---|---|---|---|---|---|---|
| P1 | A | E3/6" | 200 | 205 | 205 | 1" | 1.5" | 0.078" | 0.38 | 42 |
| P2 | C | E3/6" | 205 | 215 | 215 | 1" | 1.5" | 0.078" | 0.38 | 42 |
| P3 | C | E2/27" | 230 | 243 | 243 | 1" | 1.2" | 0.078" | 0.38 | 47 |
| P4 | A | E2/27" | 210 | 224 | 224 | 1" | 1.2" | 0.078" | 0.38 | 50 |
| P5 | A | E2/12" | 220 | 224 | 224 | 1" | 1.2" | 0.078" | 0.38 | 50 |
| P6 | B | E2/27" | 210 | 224 | 224 | 1" | 1.2" | 0.078" | 0.38 | 50 |
| E1 | G | E1/27" | 200 | 220 | 200 | 1" | 1.0" | 0.078" | 0.38 | 60 |
| E2 | H | E1/12" | 180 | 199 | 185 | 1.25" | 1.0" | 0.094" | 0.59 | 60 |

The precursor films were annealed in an 8-ply film. This means that since the precursor films are extruded as inflated tubes, when they are collapsed, they created a 2-ply film. Four of these 2-ply films are wound up together to make the 8-ply film. The annealing conditions are set forth below in TABLE 5:

TABLE 5

Annealing Conditions

| Product (see Table 4) | Annealing Temp., °C. | Annealing Time, Min | Peel strength (gram/inch) |
|---|---|---|---|
| P1 | 136 | 16 | — |
| P2 | 140 | 16 | — |
| P3 | 120 | 16 | — |
| P4, P5 | 120 | 16 | 2 |
| P6 | 135 | 16 | 0 |
| E1 | 110 | 19 | 1 |
| E2 | 115 | 19 | 1 |

The annealed precursor films are stretched to form microporous membranes. The annealed precursor films were stretched as 16-ply films (8 rolls of 2 ply films from an extruded tubular precursor). Alternatively, the annealed precursor films maybe stretched as an 8-ply film or 24-ply film. The stretching conditions are set forth in TABLE 6:

TABLE 6

Stretching Conditions

| Product (see TABLE 5) | Cold Stretch, Temp (°C.) | Cold Stretch* | Hot Stretch Temp (°C.) | Hot Stretch* | Hot Relax Temp (°C.) | Hot Relax*,[1] | Thickness (mil) | Gurley (sec) |
|---|---|---|---|---|---|---|---|---|
| P4, P5 | ambient | 25% | 120° C. | 115% | 120° C. | 40% | 0.33 | 12 |
| P6 | ambient | 25% | 135° C. | 115% | 135° C. | 40% | 0.33 | 10 |
| E1 | ambient | 40% | 119° C. | 110% | 110° C. | 50% | 0.33 | 8 |
| E2 | ambient | 45% | 115° C. | 105% | 115° C. | 40% | 0.5 | 11 |

*The percentage of the stretching/relaxing was based on the original length before cold stretching
[1] The relax step indicates that the stretched film is allowed to shrink back.

The microporous membranes, as the 16-ply films, are deplied to 2-ply films. The edge portions of the 2-ply films are trimmed, thereby separating the 2-ply film into individual, detached plies. The PP plies are trimmed 0.5 inches wider than the PE plies.

The trilayer precursor were bonded together by calendaring at 128° C., a line speed of 25 feet/minute, and a residence time at the bonding temperature of about 5-10 minutes.

The trilayer separator, made according to the foregoing example, have the properties set forth in TABLE 7:

TABLE 7

Trilayer Separator Properties

| Product | PP/PE/PP (see Table 6) | Thickness (mil) | Gurley (sec) | Puncture Strength (g) | Adhesion (g/cm) |
|---|---|---|---|---|---|
| T1 | P2/E1/P2 | 1.02 | 20 | 480 | 4.3 |
| T2 | P4,P5/E1/ P4,P5 | 1.01 | 29 | 480 | — |
| T3 | P6/E1/P6 | 1.01 | 22 | 483 | — |
| T4 | P4,P5/E2/ P4,P5 | 1.15 | 30 | 500 | 6.5 |

The properties of a trilayer battery separator are compared to other battery separators (Celgard®-type single-ply PP; Celgard®-type single-ply PE; bilayer PP/PE (see U.S. patent application Ser. No. 08/348,630 filed Dec. 2, 1994); and cross-ply PE (see U.S. patent application Ser. No. 08/341,239 filed Nov. 11, 1994) in TABLE 8:

TABLE 8

Comparison of trilayer (PP/PE/PP) with other battery separators

| Property | single-ply PP | single-ply PE | bilayer PP/PE | crossply PE/PE | trilayer PP/PE/PP |
|---|---|---|---|---|---|
| thickness (mil) | 1.0 | 1.0 | 1.0 | 1.0 | 1.0 |
| Porosity (%) | 38 | 38 | 38 | 38 | 38 |
| Gurley (sec) | 25 | 25 | 25 | 25 | 25 |
| Shutdown temp (°C.) | 165 | 132 | 132 | 132 | 132 |
| Shutdown temp range (°C.) | — | 20 | 35 | 20 | 35 |
| puncture strength (g) | 380 | 290 | 490 (PP) 300 (PE) | 490 | 480 |

The present invention maybe embodied in other specific forms without departing from the spirit or essential attributes thereof, and, accordingly, reference should be made to the appended claims, rather than to the foregoing specification as indicating the scope of the invention.

I claim:

1. A shutdown, trilayer battery separator comprising a first and a third microporous polypropylene membranes sandwiching a microporous polyethylene membrane.

2. The battery separator of claim 1 further comprising a thickness ranging from about 0.5 to about 1.5 mils.

3. The battery separator of claim 2 further comprising a thickness of about 1 mil.

4. The battery separator of claim 1 wherein said puncture strength is greater than or equal to about 450 grams.

5. The battery separator of claim 4 wherein said puncture strength is greater than or equal to about 480 grams.

6. The battery separator of claims 1 further comprising a peel strength of greater than or equal to 4 grams per inch.

7. The battery separator of claim 6 wherein said peel strength is greater than or equal to 6 grams per inch.

8. A battery comprising the separator of claim 1.

9. A shutdown battery separator comprising a first and a third microporous polypropylene membranes sandwiching a microporous polyethylene membrane, said separator having: a thickness in the range of about 0.5 mils to about 1.5 mils; a puncture strength greater than or equal to about 450 grams; and a peel strength of greater than 4 grams per inch.

10. The shutdown separator according to claim 9 wherein said thickness is about 1 mil.

11. The shutdown separator according to claim 9 wherein said puncture strength is greater than or equal to about 480 grams.

12. The shutdown separator according to claim 9 wherein said peel strength is greater than or equal to about 6 grams per inch.

13. A battery comprising the separator of claim 9.

14. A method for making a microporous membrane having a thickness less than about 0.5 mils comprises the steps of:

extruding a parison;

collapsing the parison onto itself to form a flat sheet comprising two plies;

annealing the flat sheet;

stretching the flat sheet; and winding up the flat sheet, an adhesion force between the two plies being less than 8 grams per inch.

15. The method according to claim 14 for making a microporous membrane having a thickness less than or equal to about 0.33 mils wherein the adhesion force is less than 5 grams per inch.

16. The method according to claim 14 further comprising the step of quenching the extruded parison with a gas having an air pressure ranging from 0.6 to 3.0 inches of water.

17. A method of making a trilayer shutdown battery separator comprising the steps of:

providing a first and third flat sheet comprising two plies of microporous polypropylene membranes and a second flat sheet comprising two plies of a microporous polyethylene membrane made according to the method of claim 14;

deplying the first and third flat sheets of microporous polypropylene membranes;

deplying the second flat sheet of polyethylene microporous membranes;

replying the individual plies to form a polypropylene—polyethylene—polypropylene structure;

bonding the structure to form a trilayer separator; and winding—up the separator.

18. The method according to claim 17 wherein bonding comprises calendaring or adhering with adhesives or welding.

19. A shutdown, trilayer battery separator comprising a first and a third microporous polyethylene membrane sandwiching a microporous polyethylene membrane and having a thickness of less than 3 mils.

20. A battery separator comprising a first and a third microporous polypropylene membrane sandwiching a microporous polyethylene membrane and having a thickness of less than 3 mils.

* * * * *